United States Patent
Koga et al.

(10) Patent No.: US 6,738,725 B2
(45) Date of Patent: May 18, 2004

(54) ROTATION ANGLE DETECTOR

(76) Inventors: Osamu Koga, c/o Niles Parts Co., Ltd., 5-28-6, Omorinishi, Ota-ku, Tokyo (JP); Koji Uno, c/o Niles Parts Co., Ltd., 5-28-6, Omorinishi, Ota-ku, Tokyo (JP); Yasuharu Kawamura, c/o Niles Parts Co., Ltd., 5-28-6, Omorinishi, Ota-ku, Tokyo (JP)

( * ) Notice: Subject to any disclaimer, the term of this patent is extended or adjusted under 35 U.S.C. 154(b) by 0 days.

(21) Appl. No.: 10/327,853

(22) Filed: Dec. 26, 2002

(65) Prior Publication Data

US 2003/0122542 A1 Jul. 3, 2003

(30) Foreign Application Priority Data

Dec. 28, 2001 (JP) ........................................ 2001-401084

(51) Int. Cl.$^7$ ................................................ G01B 7/30
(52) U.S. Cl. ............. 702/151; 324/207.21; 324/207.25; 477/123; 702/41
(58) Field of Search ..................... 702/41, 151; 701/37, 701/41, 57; 180/443, 444, 446; 324/86, 163, 207.14, 207.22, 207.25; 477/123

(56) References Cited

U.S. PATENT DOCUMENTS 5,239,490 A * 8/1993 Masaki et al. ................ 702/41

6,416,440 B1 * 7/2002 Jeon .......................... 477/123

FOREIGN PATENT DOCUMENTS

JP 2000-009822 1/2000

* cited by examiner

Primary Examiner—John Barlow
Assistant Examiner—John Le
(74) Attorney, Agent, or Firm—Rader Fishman & Grauer PLLC

(57) ABSTRACT

In the disclosure, MR sensors 6a and 6b for detecting the periodical angle position of rotating members rotating in conjunction with a steering wheel shaft are disposed in the vicinity of rotating members. These MR sensors are connected with a CPU 12, which makes the operation/processing of data from the MR sensors to calculate an absolute steering angle, including the indication of how many times the wheel has turned (periodicity). When the ignition key is turned off, the CPU 12 changes its operation mode into a stop mode of suspending said operation/processing, after storing the periodicity and the angle position γ of the rotating members in a flash memory. If any steering has been done during the stop mode to a degree that the output voltage of the MR sensor 6a exceeds the standard voltage V ref, the comparator 4's output conditions change and the CPU temporarily releases the stop mode to calculate a value to correct the periodicity, using the angle positions at the start of stop mode and at its release, and correct the periodicity with this value.

4 Claims, 3 Drawing Sheets

(a)

(b)

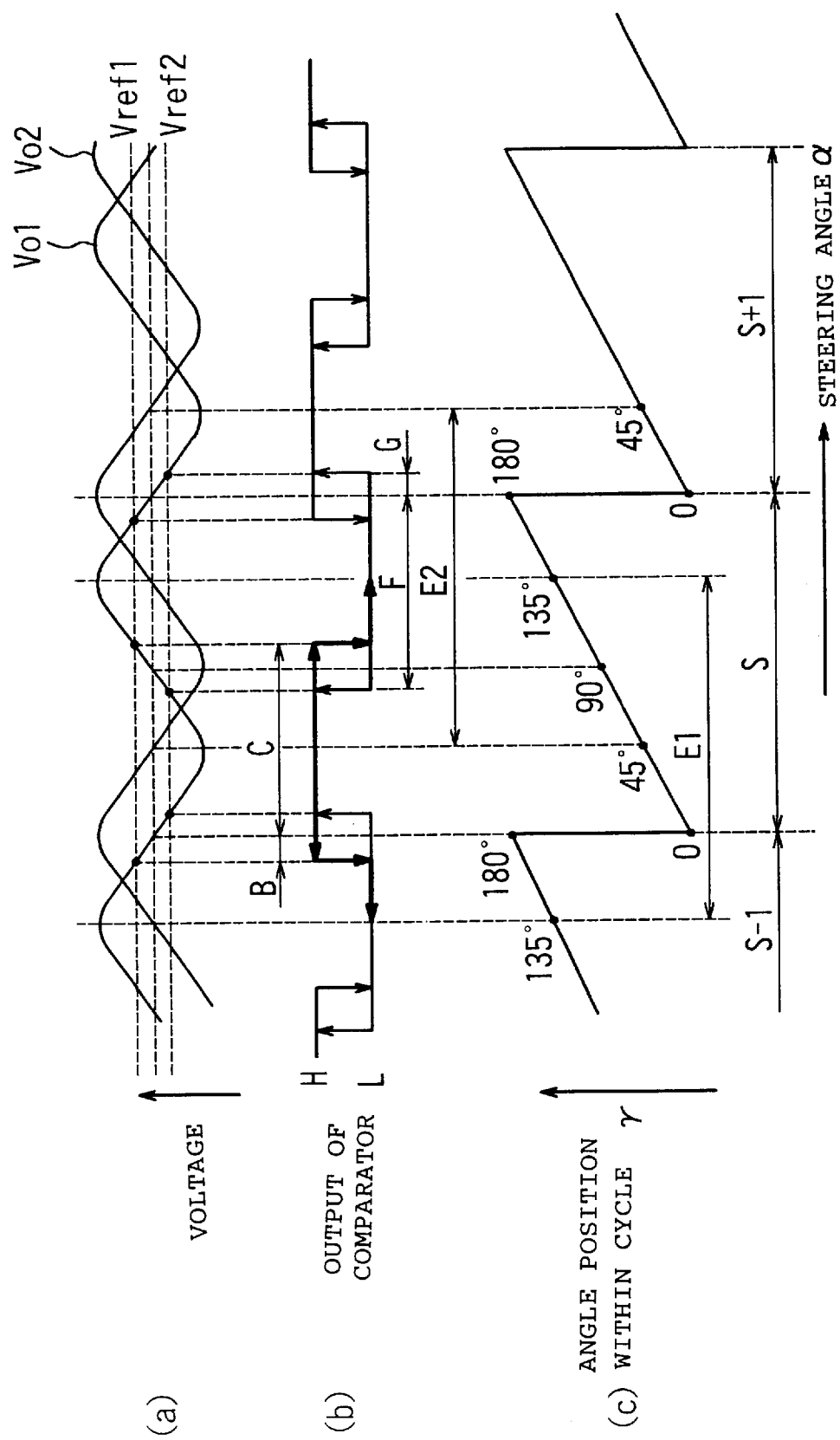

ROTATION ANGLE DETECTOR

BACKGROUND OF THE INVENTION

1. Field of the Invention

This invention relates to a rotation angle detector used for detecting the rotation angle of the steering wheel of automobiles, etc.

2. Description of the Related Art

As a rotation angle detector, there is, for instance, a steering wheel rotation angle detector that is interlocked with the steering wheel of an automobile for the automatic control of its headlamp irradiation direction so that it may change leftward and rightward. Such measurement of the wheel rotation angle must be capable of measuring a rotation angle of the steering shaft beyond 360° since the steering wheel can turn several times left or right every time.

As such a steering wheel rotation angle detector, the applicant has proposed in Published Patent Application No. 2000-009822 a rotation angle detector in which an MR sensor is disposed in the vicinity of a rotating member rotating in conjunction with the steering shaft in order to detect the periodical angle position of said rotating member and a CPU makes the operation/processing of the data from said MR sensor, using the standard angle position stored in a non-volatile data memory, to calculate an absolute steering angle, including the indication of how many times the steering wheel has turned. Since no steering wheel angle data is used when the ignition switch is off, this device is operated intermittently during the period when said switch is off to enable tracing the current wheel angle position and also saving power consumption for the CPU operation.

In the above device, its intermittent operation while the ignition switch is off can effectively save the power consumption, but if batteries are left uncharged for many hours, it may nevertheless considerably reduce the remaining power therein.

SUMMARY OF THE INVENTION

An object of this invention is therefore to provide a rotation angle detector that has been improved so as to remarkably reduce power consumption when the detector is at rest and uses no detection data.

Therefore, a first aspect according to the invention is provided with a rotating member rotating in conjunction with a body of rotation to be measured, an angle sensor disposed in the vicinity of the rotating members to detect their periodical angle positions, a non-volatile data memory for storing the standard position of the angle sensor, an operation/control means that performs the operation/processing of the standard position and the detection data from the angle sensor to determine the periodicity of the rotating member, calculates an absolute rotation angle of the body of rotation to be measured to provide a detection output, and when a stop signal is received from outside, changes from a normal operation mode of continuously reading detection data from the angle sensors and performing the operation/processing thereof to a stop mode of suspending the operation/processing, and a rotation detection means to detect that the rotating member have rotated to a prescribed angle position during the stop mode;

the operation/control means causing to store the values of angle position and periodicity of the rotating member at the time point when the stop mode is switched to, releasing the stop mode by an output signal received from the rotation detection means, determining a value to correct the periodicity of the rotating member based on the change of angle position of the rotating member taking place during a period from the start of the stop mode to its release and using this value for correction.

Upon receiving a stop signal, the operation/control means switches to the stop mode of suspending its operation/processing, so its power consumption can be saved during the stop mode. If the rotating member has rotated to a prescribed angle position during the stop mode, the operation/control means temporarily releases the stop mode, judges whether the rotating member has exceeded the standard position, based on its angle positional change, and if so, corrects its periodicity, so the current periodicity can always be known even when the operation/control means is at rest.

A second aspect according to the invention is that a comparator that receives the output signal from the angle sensor is used as the rotation detection means.

By using a comparator as the rotation detection means, whether the rotating members have rotated to a prescribed angle position can easily be judged based on the comparator output conditions.

A third aspect according to the invention is that a hysteresis has been set up in the output from the comparator.

Setting up a hysteresis in the output from the comparator can facilitate the comparator to stably detect that the rotating member has rotated.

A fourth aspect according to the invention is that power voltage supplied to the angle sensors is set up at a low level during the stop mode.

A low-level power voltage supplied to the angle sensor during the stop mode can further save power consumption.

BRIEF EXPLANATION OF THE DRAWINGS

FIG. 3, consisting of FIGS. 3A, 3B, and 3C, shows the relations between the angle position the driven gears and the output from the comparator.

DESCRIPTION OF THE PREFERRED EMBODIMENTS

An embodiment of this invention applied to the steering wheel angle detection in automobiles will hereinafter be explained in detail.

Figure 1:
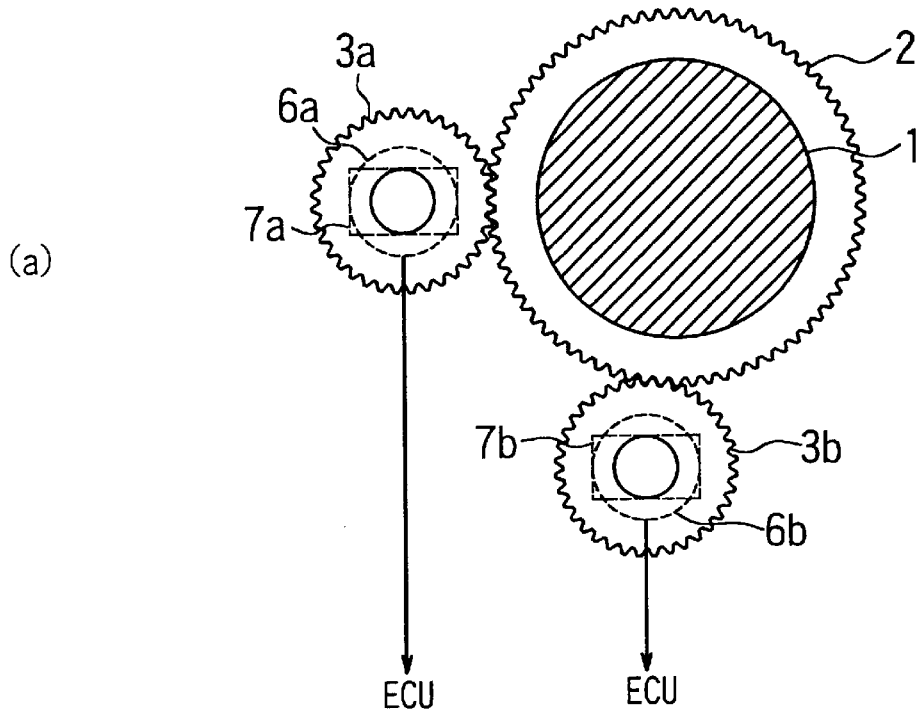
FIG. 1, consisting of FIGS. 1A and 1B, shows a layout of the angle sensor in the embodiment.
Figure 1:
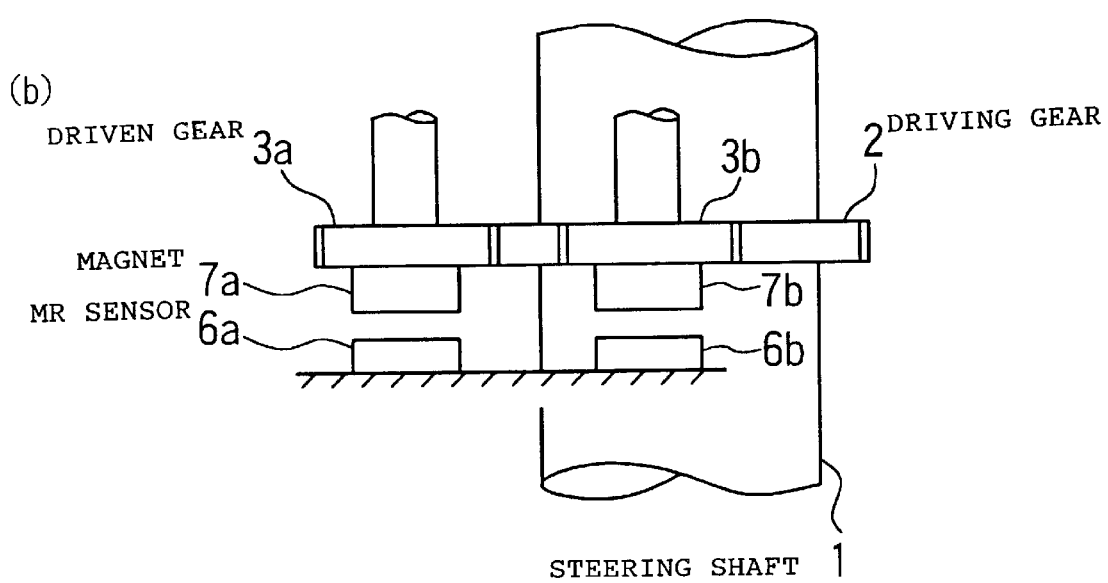

FIG. 1 shows a layout of an angle sensor section in this embodiment; FIG. 1($a$) sees it along a steering wheel shaft and FIG. 2($b$) sees it in the direction perpendicular to it.

A drive gear 2 is fixed around the steering wheel shaft 1 as a body of rotation to be measured so that the gear 2 may rotate together with the shaft 1. The drive gear 2 engages with driven gears 3 (3$a$ and 3$b$) with the same number of gear teeth, both of which turn by the same angle. Magnets 7$a$, 7$b$ are fixed to the respective back faces of the driven gears 3$a$ and 3$b$.

Below the driven gears 3$a$ and 3$b$, MR (magnetic resisting) sensors 6$a$ and 6$b$ are attached to a fixed member on the car body at the position opposing to the magnets 7 respectively. MR sensors 6$a$ and 6$b$ detect the rotations of the driven gears 3 each in one with the magnets 7 through their changing magnetic fields at an interval of 90° phase difference. In other words, the MR sensors 6$a$ and 6$b$ detect an angle position within a range of ½ turns (1 cycle) of each driven gear 3 principally, and output a periodical angle position in response to the rotation of driven gears 3.

Figure 2:
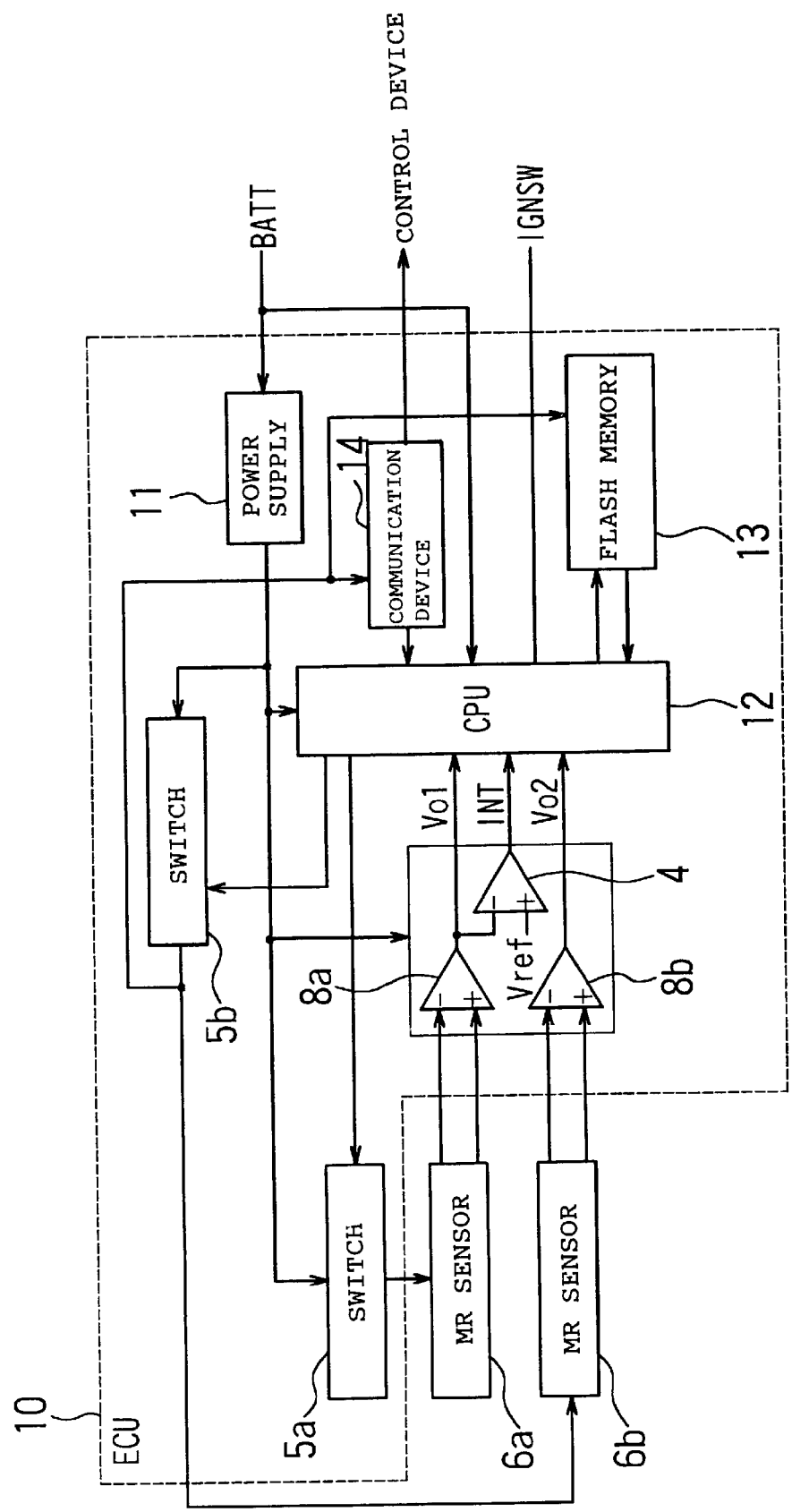
FIG. 2 shows the construction of an electronic control unit.

FIG. 2 shows the construction of an electronic control unit (ECU) 10 that receives the output from the MR sensors.

The electronic control unit 10 is provided with a CPU 12 and a power supply 11, and the output signals from the MR sensors 6a and 6b are amplified by amplifiers 8a and 8b and then sent to the CPU 12. Further, a comparator 4 is connected with the output of the amplifier 8a. The output signal from the comparator 4 is sent to the CPU 12, to which a flash memory 13 is connected.

The power supply 11 is directly connected with the batteries (BATT) carried by the car, changes the battery voltage into a prescribed one for use of MR sensor operation and then supplies it to the MR sensors 6a and 6b. Switches 5a and 5b controlled by the CPU 12 are provided between the power supply 11 and the MR sensors 6a and 6b.

The CPU 12 is further connected with the controls on the car via communication device 14, and receives the ON/OFF signal input of ignition switch (IGN SW).

The CPU 12 performs the prescribed operation/processing based on the output signals from the MR sensors 6a and 6b after they are amplified by the amplifiers 8a and 8b, to determine the steering angle of the steering wheel shaft 1 and outputs it to the controls on the car via the communication device 14.

The flash memory 13 and the communication device 14 are supplied with power from the power supply 11 through the switch 5b. The amplifiers 8a and 8b and the comparator 4 are supplied with power directly from the power supply 11.

Next, an explanation will be given about the operation of the system mentioned above.

As the MR sensors 6a and 6b output the periodical angle position in response to the rotation of the driven gears 3 as mentioned above, the steering angle a of the steering wheel shaft 1 can be shown by the equation (1) below, assuming that the number of teeth of the drive gear 2 is 'm', that of the driven gear 3 is 'n', the rotation angle of the driven gear 3 is β, and especially the angle position of the same within S th-time cycle is γ.

$$\alpha = (n/m) \times \beta \quad (1)$$
$$= (n/m) \times (\gamma - \gamma 0 + S \times 180°),$$

where γ0 is the standard position of absolute steering angle that is equivalent to a straight-run position of the car.

The relation between a steering angle a and an angle position within the cycle γ is as shown in FIG. 3(c).

After amplified by the amplifiers 8a and 8b, signals Vo1 and Vo2 from the MR sensors 6a and 6b are output to the CPU 12 in response to the rotation of the driven gears 3 at an interval of 90° as shown in FIG. 3(a). The signals Vo1 and Vo2 are shown as follows.

Vo1=Vo×sin 2γ

Vo2=Vo×cos 2γ, where Vo is amplitude voltage.

The CPU 12 computes the angle position γ based on the signal voltages Vo1 and Vo2 from the amplifiers 8a and 8b, using the equation below:

γ=tan$^{-1}$(Vo1/Vo2)

And the CPU 12 computes the steering angle α by means of the equation (1), using the angle position γ and the periodicity S obtained by tracing γ.

When the MR sensors 6a and 6b are set up for the driven gears 3, the standard position of absolute steering angle γ0 is set up as the angle position γ, along with the periodicity S=0, when the car is in straight-run conditions. These initial values are set up from outside through the communication device 14 and stored in the flash memory 13.

The above operation is done by the CPU 12, and the change of periodicity S can be determined by tracing the above angle position γ.

Keeping the electronic control unit 10 operating intermittently to trace the angle position γ even when the car is not driven will lead to consuming much battery power if the car batteries are left uncharged for many hours. Then, in this embodiment, the electronic control unit 10 takes the normal operation mode when the ignition switch is on, but takes the stop mode when the ignition switch is off.

In the stop mode, the CPU 12 suspends the operation/processing of steering angle and also controls the switch 5b so as to stop the supply of power to the MR sensor 6b, the communication device 14 and the non-volatile memory 13. Further, it controls the switch 5a to lower the voltage output from the MR sensor 6a. By this, power consumption in the stop mode can be reduced, for instance, to ⅕ that in the normal operation mode.

Thus, power consumption in the electronic control unit 10 can largely be reduced during the stop mode by shutting off power supply or reducing the voltage supplied.

In the normal operation mode of the electronic control unit 10, on the other hand, the CPU 12 supervises the output of the power supply 11. When power voltage abnormally lowers below a prescribed level due to cranking when starting the engine, etc., the normal operation mode changes into the stop mode in which power consumption is reduced to save power consumption.

When the output voltage from the power supply 11 has recovered, the normal operation mode resumes.

When the normal operation mode changes into the stop mode, the CPU 12 causes the flash memory 13 to store the angle position γ of the driven gears 3 and their periodicity S which are computed when receiving the IGN SW off signal, and also store the comparator 4's output conditions. The CPU 12 further sets up the system so that if comparator 4's output conditions have changed, the stop mode may be temporarily released.

If the steering wheel is operated to rotate the driven gears 3 and the output Vo1 from the MR sensor 6a, after amplified by the amplifier 8a, has exceeded the standard voltage V$_{ref}$ of the comparator 4 during the stop mode, the comparator 4's output conditions will change. The CPU 12 detects this change, temporarily releases the stop mode, and controls so that the voltage in the normal operation mode may apply to the switch 5a and voltage may apply to the switch 5b.

The CPU 12 computes the angle position γ of the driven gears 3 based on the output voltage from the amplifiers 8a and 8b.

Based on this angle position γ, judgment is done on whether steering was done to such a degree that the driven gears 3 have rotated beyond the standard angle position (0°) that is the turn of a cycle, and if so, the periodicity S is corrected according to the rotation direction of the driven gears 3.

Next, an explanation will be done about the correction of periodicity S in reference to FIG. 3.

Here the explanation is made assuming that the power voltage supplied to the MR sensor 6a is the same voltage as in the normal operation mode and the output voltage of the MR sensor 6a is the same as in the normal operation mode.

However, both of the actual output voltage and the standard voltages $V_{ref}1$ and $V_{ref}2$ are ⅕ of those in the normal operation mode. By the way, there is no change in the position where comparator 4's output conditions vary.

Two standard voltages have been set up in the comparator 4. These voltages are obtained by the feedback of output. That is, if the output is at a level H, the standard voltage is $V_{ref}1$, and if the output is at a level L, the standard voltage is $V_{ref}2$. The provision of a hysteresis in the output like this can prevent the repeated occurrences of the operation of the comparator 4, of an interruption to temporarily release the stop mode, and of the CPU operation to correct the periodicity S due to the steering vibrations going to and fro across the position equivalent to the standard voltage, which are likely to take place if steering operation stops when the output voltage from the MR sensor 6a stays near the standard voltage. Thus it can keep power consumption low.

FIG. 3(*b*) shows the change of the comparator 4's output conditions when the steering wheel is operated to rotate the driven gears 3 during the stop mode.

If the comparator 4's output conditions have changed, the CPU012 releases the stop mode, calculates the current angle position γ of the driven gears 3 and compares it with that at the start of the stop mode to judge whether the steering was made to a degree that the driven gears 3 have rotated beyond the standard position, and if so, corrects the periodicity S of the driven gears 3 stored in memory.

Since it takes only a short time from releasing the stop mode to becoming able to detect the angle position, it is possible to assume the change of angle position of the driven gears 3 within E1, i.e, one cycle. Meanwhile, it is also possible to assume it within E2.

Explanations will be done below about various cases of the rotation change of the driven gears 3.

(1) If the angle position γ of the driven gears 3 is in the region C where comparator 4's output is H and the periodicity is S, when the mode changed into the stop mode: If the angle position γ is within a scope of 0° to 135° when the stop mode is released, the driven gears 3 rotate in the (+) direction and the rotation of the driven gears 3 does not exceed the standard position 0° (180°), so there is no change in the periodicity S. Therefore no correction is done on the periodicity S.

On the other hand, if the angle position γ is within a scope of 135° to 180°, the driven gears 3 have rotated in the (−) direction beyond the standard position 0° (180°), so correction should be done by subtracting 1 from the periodicity S.

(2) If the angle position γ of the driven gears 3 is in the region B where the comparator 4's output is H and the periodicity is S−1, when the mode changed into the stop mode: If the angle position γ is within a scope of 135° to 180° when the stop mode is released, the driven gears 3 have rotated in the (−) direction and do not exceed the standard position, so no correction is done on the periodicity S−1.

On the other hand, if the angle position γ is within a scope of 0° to 135° when the stop mode is released, the driven gears 3 have rotated in the (+) direction beyond the standard position, so correction should be done by adding 1 to the periodicity S−1.

(3) If the angle position γ of the driven gears 3 is in the region F where comparator 4's output is L and the periodicity is S, when the mode changed into the stop mode:

If the angle position γ is within a scope of 45° to 180° when the stop mode is released, the driven gears 3 have rotated in the (−) direction and do not exceed the standard position 0° (180°), so there is no change in the periodicity S.

On the other hand, if the angle position γ is within a scope of 0° to 45°, the driven gears 3 have rotated in the (+) direction beyond the standard position, so correction should be done by adding 1 to the periodicity S stored.

(4) If the angle position γ is in the region G where comparator 4's output is L and the periodicity is S+1, when the mode changed into the stop mode:

If the angle position γ is within a scope of 0° to 45° when the stop mode is released, the driven gears 3 have rotated in the (−) direction and do not exceed the standard position, so no correction should be done on the periodicity S+1.

On the other hand, if the angle position γ is within a scope of 45° to 180° when the stop mode is released, the driven gears 3 have rotated in the (−) direction beyond the standard position, so correction should be done by subtracting 1 from the periodicity S+1.

As mentioned above, the CPU 12 determines the region of the angle position when the mode changed into a stop mode, using the angle position and the comparator 4's output stored as of the start of this stop mode, and judges whether any steering operation has been done beyond the standard position during this stop mode, by comparing the angle position as of its start with that as of its release, and if it judges so, it corrects the periodicity. The corrected periodicity is stored again in the flash memory. By these arrangements, no error can occur when the ignition switch is turned on and the normal operation mode resumes.

In this embodiment that is constructed as mentioned above, such arrangements have been made that when the ignition switch is off, the mode changes into the stop mode of suspending the operation/processing, etc. and that if steering is done beyond the standard position during this stop mode, the periodicity S stored is corrected. This enables not only saving power consumption while the ignition switch is off but also preventing the missing of current periodicity S that changes by steering operation during the time when the CPU 12 does not operate. When the ignition switch is on, the CPU 12 can detect the absolute steering angle without any detection error.

As explained above, when the operation/control means receives a stop signal from outside, the normal operation mode of making continuous reading detection data from the angle sensor and operation/processing thereof changes into the stop mode of suspending these operations, and when the rotation detection means detects that the rotating member have rotated to a prescribed angle position, the operation/control means temporarily releases the stop mode to determine a value to correct the periodicity of the rotating member based on the change of the angle position of the rotating member during a period from the start of the stop mode to its release. Therefore, the operation/control means does not miss the periodicity all the time even during the period when it is at rest, and can compute the absolute rotation angle as soon as the stop mode is released.

In the stop mode, further, there is no need to cancel this mode for the CPU to determine the periodicity of rotating members until it has rotated to a prescribed angle position, and the CPU power consumption can therefore considerably be saved.

If a comparator is used as the rotation detection means, it is possible to easily determine whether the rotating member has rotated to a prescribed angle position, based on the comparator's output conditions.

Further if a hysteresis is set up in the output from the comparator, it can more stably detect that the rotating member has rotated.

In the stop mode, further, power consumption can be even more saved if a lower level of power voltage is set up to be supplied to the angle sensor, along with the suspension of operation/processing in the operation/control means.

What is claimed is:

1. A rotation angle detector comprising:

a rotating member rotating in conjunction with a body of rotation to be measured, an angle sensor disposed in the vicinity of said rotating member to detect a periodical angle position thereof, a non-volatile data memory for storing the standard position of said angle sensor, an operation/control means that the performs operation/processing of the standard position and the detection data from the angle sensors to determine the periodicity of said rotating members, calculates an absolute rotation angle of said body of rotation to be measured to provide a detection output, and when a stop signal is received from outside, changes from a normal operation mode of continuously reading detection data from said angle sensors and performing the operation/processing thereof to stop mode of suspending said operation/processing, and a rotation detection means to detect that said rotating members have rotated to a prescribed angle position during said stop mode;

wherein said operation/control means causes to store the values of angle position and periodicity of said rotating member at the time point when the stop mode is switched to, temporarily releases said stop mode by an output signal received from said rotation detection means, determines a value to correct the periodicity of said rotating member based on the change of angle position of said rotating member taking place during a period from the start of said stop mode to its release and uses this value for correction, and wherein during the normal operation mode the ignition switch is on and during the stop mode the ignition switch is off.

2. A rotation angle detector according to claim 1, wherein said rotation detection means is a comparator that receives an output signal from said angle sensor.

3. A rotation angle detector according to claim 2, wherein a hysteresis is set up in the output from said comparator.

4. A rotation angle detector according to claim 1, 2 or 3, wherein the power voltage supplied to said angle sensors is set up at a low level during said stop mode.

* * * * *

UNITED STATES PATENT AND TRADEMARK OFFICE
CERTIFICATE OF CORRECTION

PATENT NO.    : 6,738,725 B2
DATED         : May 18, 2004
INVENTOR(S)   : Osamu Koga et al.

It is certified that error appears in the above-identified patent and that said Letters Patent is hereby corrected as shown below:

<u>Title page,</u>
Item [73], Assignee, should read -- Niles Parts Co., Ltd. Tokyo (JP) --

Signed and Sealed this

Twenty-fourth Day of May, 2005

JON W. DUDAS
*Director of the United States Patent and Trademark Office*